United States Patent

Maley et al.

[15] 3,660,677

[45] May 2, 1972

[54] INTERCHANGER 1 CIRCUITS

[72] Inventors: Gerald A. Maley, Fishkill; James L. Walsh, Hyde Park, both of N.Y.

[73] Assignee: International Busness Machines Corporation, Armonk, N.Y.

[22] Filed: Feb. 5, 1971

[21] Appl. No.: 113,000

[52] U.S. Cl. ............................................307/209, 307/214

[51] Int. Cl. ......................................H03k 19/08, H03k 19/40

[58] Field of Search ............................307/209, 214; 328/205

[56] References Cited

UNITED STATES PATENTS 3,156,830 11/1964 Walsh ....................................307/209

3,060,330 10/1962 Trampel ..................................307/209

*Primary Examiner*—John Zazworsky

*Attorney*—Hanifin and Jancin and Martin G. Reiffin

[57] ABSTRACT

A ternary logic circuit provides the Interchanger 1 logic function whereby for an input of levels 0, 1 or 2 there arises an output with levels 2, 1 or 0, respectively. A transistor current switch has two current paths only one of which includes a load impedance, the other current path bypassing the load impedance. A current source provides two units of current. Either none, one or both of the current units flow in the load impedance to provide the respective output levels, depending upon the input signal.

11 Claims, 2 Drawing Figures

PATENTED MAY 2 1972 3,660,677

INVENTORS
GERALD A. MALEY
JAMES L. WALSH
BY Martin G. Reiffin
ATTORNEY

INTERCHANGER 1 CIRCUITS

BACKGROUND OF THE INVENTION

1. Field of the Invention

The Interchanger 1 circuit provides an output of 1 when the input is 1, an output of 2 when the input is 0, and an output of 0 when the input is 2. In ternary or three-valued logic, the circuit is important for two reason: First, it is part of a minimum complete logic set, the other members of the set being the Interchanger 0 and Interchanger 2 circuits. Second, it is the ternary equivalent of the binary inverter in that the Interchanger 1 circuit relates AND circuits to OR circuits in the ternary version of De Morgan's Theorem.

2. Description of the Prior Art

Ternary logic circuits are known in the prior art; for example, U.S. Pat. No. 3,156,830 issued Nov. 10, 1964, discloses a three-level asynchronous switching circuit which provides the Interchanger 1 function.

The present invention provides a novel Interchanger 1 circuit having several advantages over the prior art. First, the present circuit is easier to design and provides lower power dissipation. Second, it provides an output having the same values as the input and which may be used to provide feedback when the Interchanger 1 circuit is embodied in a latch.

SUMMARY OF THE INVENTION

It is therefore a primary object of the present invention to provide a novel Interchanger 1 circuit which gives an output of 1 when the input is 1, and output of 2 when the input is 0, and an output of 0 when the input is 2.

A further object is to provide an Interchanger 1 circuit which is easily designed and provides low power dissipation.

Still another object is to provide a novel Interchanger 1 circuit having an output available for feedback and which has the same values as the input.

These objects are achieved by a novel arrangement wherein a transistor current switch provides two current paths. One of the paths includes a load resistor which is bypassed by the other path. Two units of current are provided by two current sources. In accordance with the input signal either both, or none or one of the current units flow in the load resistor. When none of the current flows, the voltage at the lower end of the load resistor is at the uppermost or 2 level. When one unit of current flows through the load resistor, the voltage is at the intermediate or 1 level. When both units of current flow, the voltage is at the lowermost or 0 level.

DESCRIPTION OF THE PREFERRED EMBODIMENTS

Figure 1:
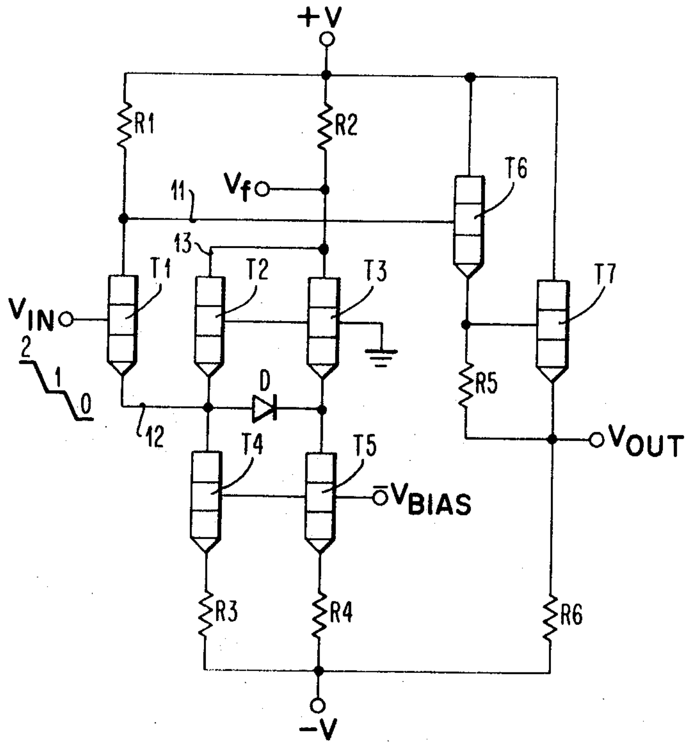
FIG. 1 is a circuit diagram showing a first embodiment of the present invention.

Referring first to FIG. 1, there is shown an Interchanger 1 circuit in accordance with the present invention. The Interchanger 1 function is as follows: for an input of 0, the output is 2; for an input of 1, the output is 1; for an input of 2, the output is 0.

The input is applied to the base of transistor T1. There are two outputs. The output designated as $V_f$ at the collector of transistors T2 and T3 is the same as that at the input $V_{in}$ and is used for feedback when embodying the Interchanger 1 circuit in a latch circuit. The Interchanger 1 function is provided at the emitter of transistor T7 and designated as $V_{out}$.

The input terminal $V_{in}$ is connected to the base of transistor T1. The emitter of the latter is connected by lead 12 to the emitter of transistor T2 in turn having its emitter connected by diode D to the emitter of transistor T3. The bases of transistor T2, T3 are connected to ground. The collector of transistor T2 is connected by lead 13 to the collector of transistor T3 in turn Connected to the lower end of a resistor R2 having its upper end connected to the potential source +V. The collector of transistor T1 is connected to the lower end of a load resistor R1 having its upper end connected to said potential source +V. The bases of transistors T2, T3 are connected to ground.

Two constant current sources are provided by transistors T4,T5 having resistors R3, R4 extending from their emitters to a potential source −V. The bases of transistors T4, T5 are connected to a bias source $-V_{bias}$. The collector of transistor T4 is connected to the emitter of transistor T2 and the collector of transistor T5 is similarly connected to the emitter of transistor T3.

In order to lower the output voltage to that of the input level, there is provided an emitter-follower arrangement comprising transistors T6 and T7. The collector of transistor T1 is connected by lead 11 to the base of transistor T6. The collectors of transistors T6, T7 are connected to the potential source +V. The emitter of transistor T6 is connected to the base of transistor T7 and is also connected to the upper end of resistor R5 having its lower end connected to the output line $V_{out}$. Also connected to the latter is the emitter of transistor T7 and the upper end of a resistor R6 having its lower end connected to the potential −V.

Transistors T4 and T5, together with resistors R3 and R4, constitute two current sources. When the signal at $V_{in}$ is 0, transistor T1 is off and the current from transistors T4, T5 flows through transistors T2,T3 and resistor R2. No current flows through resistor R1, the load resistor of transistor T1, and hence, the potential of line 11 at the collector of transistor T1 is at its uppermost level designating a 2. Transistors T6, T7 and resistors R5, R6 constitute an emitter-follower having two diode drops in order to make the input and output voltage levels equal. The potential at output $V_{out}$ is therefore at its uppermost level designating a 2.

If the input potential at $V_{in}$ is at a 1 level, transistor T2 shuts off, and transistor T1 conducts a single unit of current from transistor T4. Both output $V_f$ and $V_{out}$ will then be at the intermediate level designating a 1. If the input potential at $V_{in}$ is at its uppermost level designating a 2, then both transistors T2 and T3 are shut off and transistor T1 conducts two units of current, one unit from transistor T4 and the other from transistor T5. The output at $V_f$ is at its uppermost level designating a 2 and the output at $V_{out}$ is at its lowermost level designating a 0. Diode D serves to prevent transistor T3 from being shut off when the input is at the intermediate or 1 level.

Figure 2:
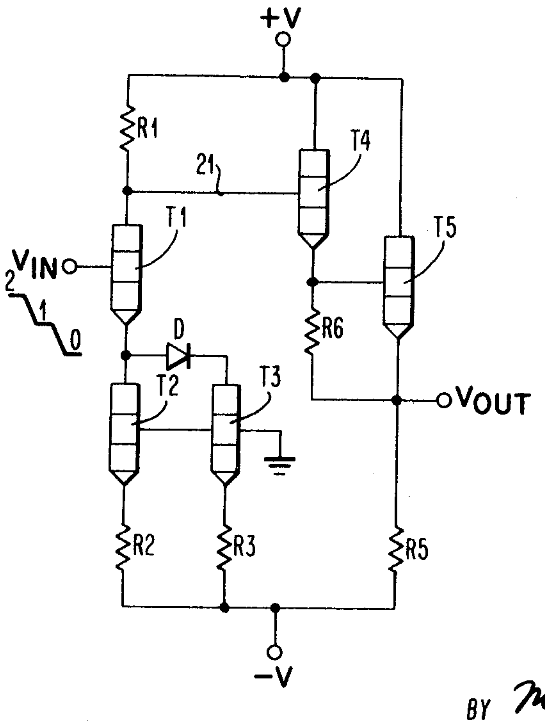
FIG. 2 is a circuit diagram showing a second embodiment.

Referring now to FIG. 2, there is shown a modified form of the invention. The input terminal $V_{in}$ is connected to the base of transistor T1 having its emitter connected to the collector of a transistor T2 constituting one of the current source transistors, the other being transistor T3. A diode D extends from the collector of transistor T2 to the collector of transistor T3. The bases of transistors T2 and T3 are connected to ground. The emitter of transistor T2 is connected by resistor R2 to a potential source −V and the emitter of transistor T3 is connected by a resistor R3 to said potential source −V. The connector of transistor T1 is connected to the lower end of a load resistor R1 having its upper end connected to a potential source +V.

An emitter-follower arrangement comprises transistors T4 and T5. The base of transistor T4 is connected by lead 21 to the collector of transistor T1. The emitter of transistor T4 is connected to the base of transistor T5. The collectors of both transistors T4 and T5 are connected to a potential source +V. The emitter of transistor T4 is connected by resistor R6 to the emitter of transistor T5 to which is connected the output terminal $V_{out}$. The latter is connected to the upper end of a resistor R5 having its lower end connected to the potential source −V.

When the input at $V_{in}$ is 0, transistor T1 is cut off and the collector base diodes of T2 and T3 are also off. Current flows from ground through the emitter base diodes of transistors T2 and T3 and through resistors R3 and R2 to the potential source −V. Since transistor T1 is off, there is no current flowing through load resistor R1. The potentials at line 21 and $V_{out}$ are at the uppermost level or the value 2.

If the input is at the intermediate level 1, transistor T1 conducts one unit of current, and diode D and the collector base diode of transistor T3 remain off. The output will then be at the intermediate level or 1. If the input is at the uppermost or 2 level, transistor T1 conducts two units of current, diode D conducts, and transistors T2 and T3 operate normally. The output is at the lowermost or 0 level.

It is to be understood that the specific embodiments disclosed herein are merely illustrative of two of the many forms which the invention may take in practice without departing from the scope of the invention as delineated in the appended claims and that the claims are to be construed as broadly as permitted by the prior art.

We claim:

1. An Interchanger 1 circuit comprising
an input line adapted to assume the potential level values 0, 1 and 2,
an output line,
means causing the output line to assume the potential level values 2, 1 and 0 respectively in response to potential level values of 0, 1 and 2 of the input line ,
said means comprising current source means supplying two units of current,
a load impedance,
means for causing to flow in said load impedance either none, one or both of said units of current,
said last-recited means comprising a current switch having two current paths,
one of said current paths including said load impedance,
the other current path bypassing said load impedance,
said one current path comprising a transistor having a base,
said circuit having an input line connected to said base,
said other current path comprising a pair of transistors each having an emitter, and
means connecting said emitters to said current source means.

2. An Interchanger 1 circuit as recited in claim 5 and comprising
means for turning on both of said other current path transistors in response to a 0 potential level value on said input line,
for turning on one of said other current path transistors in response to a 1 potential level value on said input line, and
for turning off both of said other current path transistors in response to a 2 potential level value on said input line.

3. An Interchanger 1 circuit as recited in claim 2 wherein
said one current path transistor has a collector,
said load impedance being connected to said collector, and
a network connecting said output line to the junction of said load impedance and said collector.

4. An Interchanger 1 circuit as recited in claim 7 wherein said network comprises emitter follower means connected between said junction and said output line.

5. An Interchanger 1 circuit as recited in claim 1 wherein
said first-recited transistor has an emitter,
conductive means connecting the emitter of said first-recited transistor to the emitter of one of said pair of transistors, and
unilateral conductive means connecting the emitter of said one transistor of said pair to the emitter of the other transistor of said pair.

6. An Interchanger 1 circuit as recited in claim 5 wherein
said unilateral conductive means comprises a diode having one terminal connected to said one transistor emitter and another terminal connected to said other transistor emitter.

7. An Interchanger 1 circuit as recited in claim 1 wherein
said first-recited transistors have an emitter,
said current source means comprising a pair of current sources,
means connecting one of said current sources to the emitters of said first-recited transistor and said one transistor of said pair of transistors, and
means connecting the other of said current sources to the emitter of said other transistor of said pair of transistors.

8. An Interchanger 1 circuit as recited in claim 7 and comprising
unilateral conductive means connecting the emitter of said one transistor of said pair to the emitter of the other transistor of said pair.

9. An Interchanger 1 circuit as recited in claim 1 wherein
said current source means comprises a pair of transistors each having a collector,
means connecting one of said current source transistor collectors to the emitters of said first-recited transistor and said one transistor of said pair of transistors, and
means connecting the other of said current source transistor collectors to the emitter of said other transistor of said pair of transistors.

10. An Interchanger 1 circuit as recited in claim 9 and comprising
diode means having one end connected to one of said current source transistor collectors and another end connected to the other of said current source transistor collectors.

11. An Interchanger 1 circuit as recited in claim 9 wherein
each of said current source transistors has a base and an emitter,
a pair of potential sources,
means connecting said current source transistor bases to one of said potential sources, and
means connecting said current source transistor emitters to the other of said potential sources.

* * * * *

PO-1050
(5/69)

UNITED STATES PATENT OFFICE
CERTIFICATE OF CORRECTION

Patent No. 3,660,677 Dated May 2, 1972

Inventor(s) Gerald A. Maley, James L. Walsh

It is certified that error appears in the above-identified patent and that said Letters Patent are hereby corrected as shown below:

Column 3, Line 38 (In the Claims, Claim 6, Line 1) change "5" to --1--

Column 3, Line 53 (In the Claims, Claim 8, Line 2) change "7" to -- 3 --

Signed and sealed this 8th day of May 1973.

(SEAL)
Attest:

EDWARD M.FLETCHER,JR.
Attesting Officer

ROBERT GOTTSCHALK
Commissioner of Patents